United States Patent
Pasieka

(10) Patent No.: US 7,260,715 B1
(45) Date of Patent: Aug. 21, 2007

(54) METHOD AND APPARATUS FOR REVOCATION LIST MANAGEMENT

(75) Inventor: Michael S. Pasieka, Thornwood, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 412 days.

(21) Appl. No.: 09/456,689

(22) Filed: Dec. 9, 1999

(51) Int. Cl.
*H04L 9/00* (2006.01)

(52) U.S. Cl. ............................. 713/158; 713/176

(58) Field of Classification Search ............. 713/158; 345/741; 379/142.05
See application file for complete search history.

(56) References Cited

U.S. PATENT DOCUMENTS

| | | | | |
|---|---|---|---|---|
| 5,173,939 A | * | 12/1992 | Abadi et al. ................... | 707/9 |
| 5,235,642 A | * | 8/1993 | Wobber et al. ............. | 713/156 |
| 5,263,165 A | * | 11/1993 | Janis .......................... | 711/163 |
| 5,495,533 A | * | 2/1996 | Linehan et al. ............. | 713/155 |
| 5,666,416 A | * | 9/1997 | Micali ........................ | 713/158 |
| 5,677,851 A | * | 10/1997 | Kingdon et al. ............ | 709/229 |
| 5,687,235 A | * | 11/1997 | Perlman et al. ............. | 713/158 |
| 5,699,431 A | * | 12/1997 | Van Oorschot et al. ....... | 380/30 |
| 5,745,574 A | * | 4/1998 | Muftic ........................ | 713/157 |
| 5,793,868 A | * | 8/1998 | Micali ......................... | 380/28 |
| 5,832,206 A | * | 11/1998 | De Jesus et al. ............. | 713/200 |
| 6,044,462 A | * | 3/2000 | Zubeldia et al. ............. | 713/158 |
| 6,092,201 A | * | 7/2000 | Turnbull et al. ............. | 713/201 |
| 6,128,740 A | * | 10/2000 | Curry et al. ................. | 713/200 |
| 6,134,551 A | * | 10/2000 | Aucsmith .................... | 707/10 |
| 6,249,873 B1 | * | 6/2001 | Richard et al. .............. | 713/200 |
| 6,389,538 B1 | * | 5/2002 | Gruse et al. ................. | 713/194 |
| 6,397,329 B1 | * | 5/2002 | Aiello et al. ................. | 713/155 |
| 2002/0184492 A1 | * | 12/2002 | Hori et al. | |
| 2003/0212888 A1 | * | 11/2003 | Wildish et al. | |

FOREIGN PATENT DOCUMENTS

| | | |
|---|---|---|
| EP | 0930556 A2 | 1/1999 |
| WO | WO9720411 | 6/1997 |

OTHER PUBLICATIONS

I-Lung-Kao; Chow-R. An extended capability architecture to enforce dynamic access control policies. Proceedings 12th Annual Computer Security Applications Conference, San Diego, CA, USA, Dec. 9-13, 1996 Abstract☐☐.*

Michael A Epstein; Michael S. Pasieka; Security for the Digital Information Age of medicine:issues, applictions and implementation Feb. 1998 Journal of Digital Imaging.*

* cited by examiner

*Primary Examiner*—Nasser Moazzami
*Assistant Examiner*—Pramila Parthasarathy

(57) ABSTRACT

Access to information is controlled by maintaining, for a given device or other entity through which information may be accessed, a contact list that includes information identifying one or more other entities which have attempted to communicate with the given entity. In accordance with the invention, the contact list is utilized in conjunction with a revocation list stored in a memory associated with the given entity in order to determine which of the other entities are authorized to communicate with the given entity. The contact list includes a number of entries, each entry having at least an identifier of a particular one of the other entities and a corresponding revocation flag indicating whether the particular entity has been revoked. The contact list is updated after a modification of the revocation list, or if a new entity not already included in the contact list attempts to communicate with the given entity.

20 Claims, 3 Drawing Sheets

| 300 | 302 ENTITY IDENTIFIER | 304 FLAG |
|---|---|---|
| | ENTITY ID 1 | F1 |
| | ENTITY ID 2 | F2 |
| | ENTITY ID 3 | F3 |
| | ⋮ | |
| | ENTITY ID N | FN |

METHOD AND APPARATUS FOR REVOCATION LIST MANAGEMENT

FIELD OF THE INVENTION

The present invention relates generally to the field of consumer electronics devices, and more particular to techniques for controlling access to digital recordings and other types of content material via consumer electronics devices.

BACKGROUND OF THE INVENTION

A number of different copy protection techniques have been developed for protecting digital recordings and other types of copyrighted content material from unauthorized use. In many such techniques, the content material is encrypted such that it can only be decrypted using a key accessible to a compliant device. For example, an access control system for copy-protected content material may effect a key exchange with the particular compliant device, using a Diffie-Hellman key exchange or other public key cryptography technique. The access control system then uses the exchanged key to encrypt a decryption key for decrypting the content material, and supplies the decryption key to the device.

In this manner, only the intended compliant device can decrypt the content material. Generally, the access control system does not undertake the key exchange until after the particular compliant device identifies itself, and, in most cases, authenticates this identification, typically via an encrypted signature that can be verified. Other copy protection techniques that rely in whole or in part upon an identification of a receiver or other device are common in the art.

An adversary of the above-described access control system can subvert the copy protection technique by imitating a compliant device. That is, techniques are common in the art for replicating a compliant device, such that, in operation, the replicated device is virtually indistinguishable from the original. A common unauthorized business practice is the sale of "black market" or "pirated" imitations of replicated compliant devices that are intended for use in gaining unauthorized access to copy-protected content material.

In order to counteract such an adversary, device manufacturers, content providers and other issuing authorities typically publish revocation lists, itemizing each identifier that has been determined to be no longer valid. In principle, the access control system receives an identifier from the intended receiving device, compares this identifier to the list of all invalidated identifications, then grants or denies access accordingly. Each issuing authority periodically publishes a list of the recently revoked identifiers, and this list is communicated to each access control system, using a variety of techniques.

For example, if the access control system is a set-top box that only provides broadcast content material to a compliant recorder or display device, the revocation list can be transmitted to the set-top box from the provider of the broadcast services. If the access control system is a consumer digital versatile disk (DVD) player that only plays back a DVD to a compliant display device, the latest revocation list can be embedded within commercial DVD recordings. When the user of the DVD player plays a recently purchased or rented DVD recording, the DVD player reads the embedded list. When the access control system receives a new revocation list, it updates a locally stored list of revocations accordingly. Because the local revocation list at the access control system is of finite size, each access control system is typically configured to delete the oldest revocations when space is required for newer revocations.

A significant drawback of conventional techniques for managing the above-described revocation lists is the amount of computation time and other access control system resources required to determine if a given entity has been revoked. For example, it is generally necessary when using the conventional list management techniques to implement a complete search of a revocation list in order to determine if a given entity initiating communication is authorized to do so. In addition, each time a local revocation list in an access control system is modified, separate determinations generally must be made for a number of other devices, even though the system may be regularly in contact with these devices.

A need therefore exists for improved techniques for managing revocations lists, such that the amount of system resources consumed in the list management process is reduced.

SUMMARY OF THE INVENTION

The invention provides methods and apparatus for management of revocation lists in an access control system. In accordance with the invention, access to information is controlled by maintaining, for a given device or other entity through which information may be accessed, a contact list that includes information identifying one or more other entities which have attempted to communicate with the given entity. The contact list is utilized in conjunction with a revocation list, e.g., a local revocation list stored in a memory associated with the given entity, in order to determine which of the other entities are authorized to communicate with the given entity.

The contact list includes a number of entries, each entry having at least an identifier of a particular one of the other entities and a corresponding revocation flag indicating whether the particular entity has been revoked. The contact list may be updated after a modification of the local revocation list. In this case, all of the entities in the contact list that do not have their corresponding revocation flag set are identified, and a determination is made as to whether each identified entity is on a local revocation list. If such an entity is determined to be on the modified local revocation list, its revocation flag in the contact list is set.

The contact list may also be updated if a new entity not already included in the contact list attempts to communicate with the given entity. In this case, an entity identifier for the new entity is stored in the contact list if there is sufficient space available in the contact list, and the revocation flag for the new entity is set if that entity is determined to be on the current local revocation list. If there is insufficient space in the contact list for the new entity, an existing entry may be selected using a random or pseudo-random process, and the selected entry overwritten with the new entity information.

In accordance with another aspect of the invention, the contact list may be configured such that the revocation flag of a particular entry may not be cleared once that flag has been set, as long as that entry remains in the contact list. In addition, a digital signature may be periodically generated for at least a portion of the contact list, with the digital signature being updated each time the contact list is updated.

In accordance with a further aspect of the invention, each of at least a subset of the other entities may store its own contact list for use in revocation list management, such that the contact list for each entity includes entries corresponding to other entities which have attempted to communicate with that entity.

Advantageously, the invention substantially improves the efficiency of the revocation list management process, and thereby considerably reduces the amount of computation time and other system resources consumed in access control operations. These and other features and advantages of the present invention will become more apparent from the accompanying drawings and the following detailed description.

DETAILED DESCRIPTION OF THE INVENTION

For purposes of simplicity and clarity of illustration, the present invention is described herein using consumer entertainment applications involving, e.g., access control techniques used to control access to pay-per-view or other broadcast transmissions, or access control techniques used to control the number of copies that can be made of digital recordings or other types of copy-protected content material. However, it should be understood that the invention can be used in numerous other access control applications.

Figure 1:
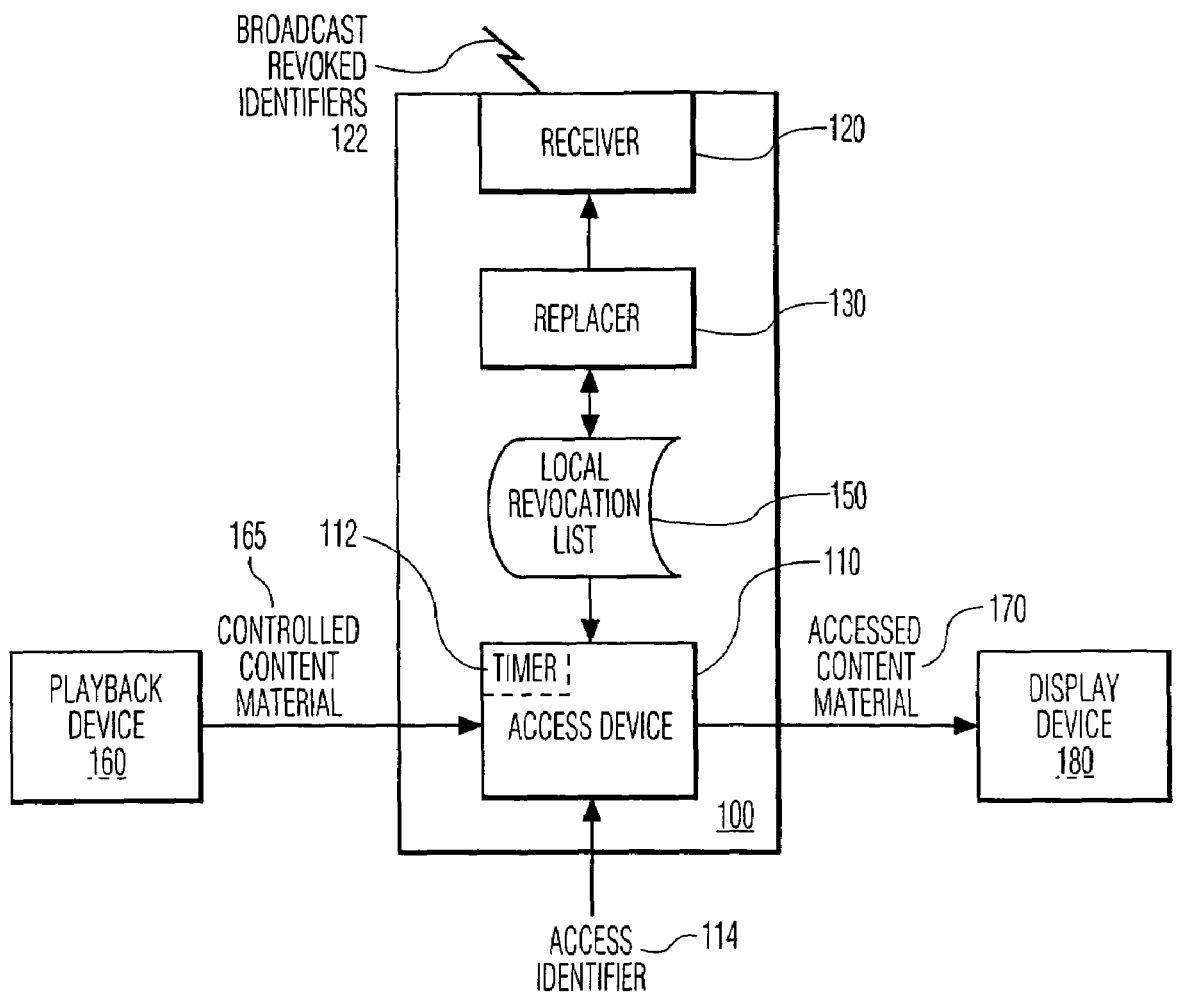
FIG. 1 is a block diagram of an exemplary access control system in which the present invention may be implemented.

FIG. 1 shows an exemplary embodiment of an access control system 100 in which the present invention may be implemented. The access control system 100 includes an access device 110 having associated therewith a timer 112 and an access identifier 114, a receiver 120 configured to receive broadcast revoked identifiers 122, and a replacer 130 which is operative to interact with a local revocation list 150. In this embodiment, the access control system 100 receives, e.g., from a playback device 160, a quantity of content controlled material 165, and if the access identifier 114 is an authorized identifier, delivers corresponding accessed content material 170, e.g., to a display device 180.

Generally, the controlled content material 165 is encrypted material, and the access device 110 within the access control system 100 decrypts the encrypted material to create the accessed content material 170 for rendering to a user, e.g., for display on the display device 180. The controlled content material 165 is illustrated in this embodiment as being provided by the playback device 160, which could be, e.g., a compact disk (CD) player, digital versatile disk (DVD) player, or other type of audio or video disc player, a magnetic tape player, a hard-drive system, etc. The controlled content material 165 may alternatively be provided via a broadcast system, cable system, satellite system or other service provider, or via a network connection with the Internet or other type of network. As is common in the art, the controlled content material 165 may be communicated among a variety of devices, e.g., to and from a recording device after being received from a service provider, etc.

The access device 110 provides the accessed content material 170 if and only if a valid access identifier 114 is provided. Generally, the access identifier 114 is a unique identifier that is associated with a decryption key and is digitally signed by a special key that is known only to a "trusted authority," typically an authorized vendor or manufacturer, or the provider of the service.

The access identifier 114 may, e.g., be contained within a "smart card" or other type of device that identifies the user, a pre-paid card-based device that does not identify the user, a set-top box, computer, television or other device that identifies an account number for charging fees, etc.

As another example, the access identifier 114 may be a unique identifier of a manufactured item, such as a recording device, that is manufactured to enforce agreed upon copy-limit standards, as discussed, e.g., in U.S. patent application Ser. No. 09/333,628, filed Jun. 15, 1999 in the name of inventor Michael Epstein and entitled "Copy Protection by Ticket Encryption," which is incorporated by reference herein.

The above-noted trusted authorities publish revocation lists comprising access identifiers which have been inappropriately used, and have therefore been revoked. For example, unauthorized copies of recorded material may contain an access identifier that was used to originally access the material, lost or stolen card-based devices may be revoked, etc. The revoked identifiers 122 may be broadcast to access control system 100 in a variety of forms, and are typically broadcast via the medium used to convey the content material.

As previously noted, the access control system 100 includes receiver 120 for receiving the broadcast revoked identifiers 122, and a local revocation list 150. The local revocation list 150 is maintained within an electronic memory or other storage device associated with the access control system 100. The nature of the receiver 120 will generally depend upon the type of broadcast used to supply the revoked identifiers 122. For example, the receiver 120 may be, e.g., a device that extracts the revoked identifiers 122 from the medium used to convey the controlled content material 165. In such an arrangement, each published CD or DVD may contain thereon a list of recent revoked identifiers 122. As another example, the receiver 120 may be a dedicated device that receives the broadcast revoked identifiers 122 from a broadcast, cable or satellite system provider via a control channel.

The local revocation list 150 is generally of finite size, and eventually will be filled with the received revoked identifiers 122. The replacer 130 may therefore be configured to randomly replace a previous entry in the list 150 with each received revoked identifier 122, using the techniques described in U.S. patent application Ser. No. 09/370,489, filed Aug. 9, 1999 in the name of inventor Michael Epstein and entitled "Updating a Revocation List to Foil an Adversary," which is incorporated by reference herein. By using such a random or pseudo-random replacement technique, the likelihood of a particular revoked identifier 122 being present in the list 150 is more difficult for an adversary to determine. As a result, an adversary cannot rely on the mere passage of time, i.e., the dropping of older revoked identifiers from a finite-sized list as new identifiers arrive, in order to circumvent the local revocation list 150.

It should be emphasized that the particular configuration of the access control system 100 as shown in FIG. 1 is by way of example only, and that in other embodiments the system 100 may be incorporated into or otherwise associated with the playback device 160, the display device 180, or other suitable device. For example, elements or groups of elements of the system 100 may collectively represent a desktop, laptop or palmtop computer, a personal digital assistant (PDA), a television, or a set-top box, as well as portions or combinations of these and other devices. It should also be understood that the invention may be implemented in other types of systems. For example, one or more of the elements of the system 100 may be implemented at least in part as an application-specific integrated circuit (ASIC), circuit card or other processor-based device to be incorporated into or otherwise associated with a television, computer, set-top box or other device.

Figure 2:
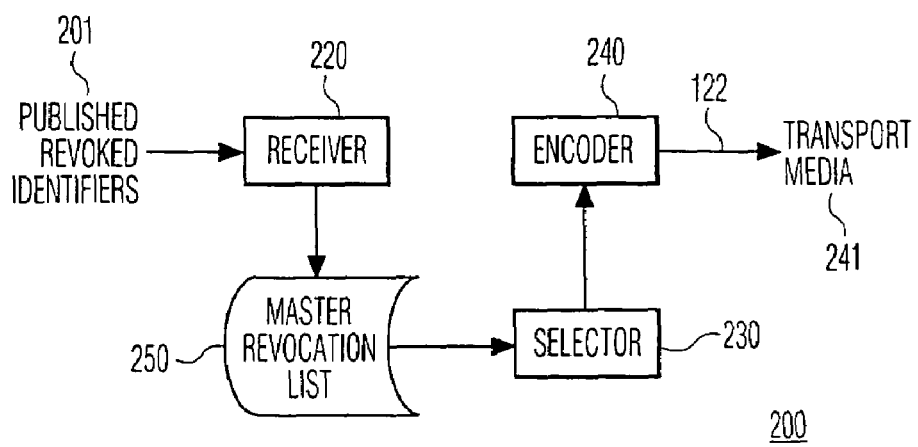
FIG. 2 illustrates the manner in which published revoked identifiers may be supplied to the access control system of FIG. 1.

FIG. 2 shows an example of a system 200 for broadcasting revoked identifiers 122 to access control system 100. Published revoked identifiers 201 are received from one or more trusted authorities via a receiver 220. The system 200 further includes a selector 230, an encoder 240 that interacts with transport media 241, and a master revocation list 250. The published revoked identifiers 201 received by the receiver 220 are stored in the master revocation list 250, which is typically substantially larger than the local revocation list 150. For example, the system 200 may be located at a cable system or other service provider headquarters, or at a disk manufacturing plant, and the master revocation list 250 may be resident in a database of virtually unlimited size.

The selector 230 randomly selects published revoked identifiers 201 from the master revocation list 250 for encoding as broadcast revoked identifiers 122 that are communicated to the remote access control system 100 via the transport media 241. The encoder 240 encodes the published revoked identifiers that are selected for broadcasting into a form suitable for the particular transport media 241. For example, the broadcast revoked identifiers 122 may be broadcast in the form of a signal that is multiplexed onto a broadcast carrier, encoded on a track of a CD or DVD, included in the header of a VCR tape, etc. Additional details regarding the operation of the system 200 are provided in the above-cited U.S. patent application of Michael Epstein entitled "Updating a Revocation List to Foil an Adversary."

The present invention is directed to techniques for managing revocation lists such as the above-described local revocation list 150 of the access control system 100. As will be described in greater detail below, the invention utilizes an additional list, referred to herein as a contact list, for more efficiently managing revocation list updates in the presence of modifications or additional devices attempting to establish communication with the access control system 100.

Figures 3, 4:
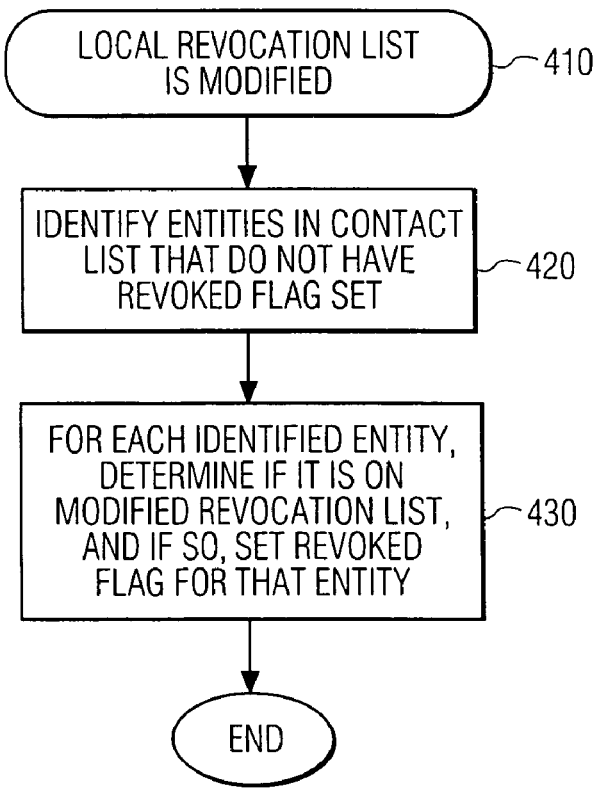
FIG. 3 shows an example of a contact list that is maintained by the access control system of FIG. 1 in accordance with an illustrative embodiment of the invention.
FIGS. 4 and 5 are flow diagrams illustrating update operations performed in conjunction with the contact list of FIG. 3 in the illustrative embodiment of the invention.

FIG. 3 shows an example of a contact list 300 which includes a set of entity identifiers 302 and a set of corresponding revocation flags 304. The entity identifiers 302 generally include an entity identifier for each entity which is in communication with the access control system 100. It is assumed in this embodiment that each of the entities represents a device that has communicated with the access control system 100. The term "entity" as used herein should therefore be understood to include any type of device that may attempt to establish communications with or otherwise interact with the access control system 100.

Each row of the contact list 300 stores the identifying information for a given entity and a corresponding flag specifying if the entity has been revoked, i.e., is currently present or has previously been present on the local revocation list 150 of the system 100. For example, the contact list 300 as shown in FIG. 3 includes N entries, with entity identifiers ID 1, ID 2, . . . ID N and corresponding flags F1, F2, . . . FN. Each of the flags F1, F2, . . . FN is assumed in this embodiment to be a binary flag, e.g., it can either have a particular one of two binary values, referred to as its "set" value, or the opposite binary value, referred to as its "unset" value.

The contact list 300 may be implemented in a straightforward manner in a memory device incorporated in or otherwise associated with the access control system 100, e.g., it may be implemented in a portion of the memory used to implement the local revocation list 150. The particular value of N may vary depending upon the application, based on factors such as the memory capacity of the access control system 100. The term "list" as used herein is intended to include a table or any other arrangement of information that may be stored in a memory device.

FIG. 4 is a flow diagram illustrating the manner in which the contact list 300 may be updated after a modification to the local revocation list 150. In step 410, the local revocation list 150 is modified, e.g., by replacer 130 in response to receipt of one or more broadcast revoked identifiers 122. Step 420 then identifies all of the entities in the contact list 300 that do not have their corresponding revocation flag set. Step 430 then determines, for each of the entities identified in step 420 as being on the contact list 300 but not having a set revocation flag, whether that entity is on the modified local revocation list 150. If such an entity is determined to be on the modified local revocation list, its revocation flag is set in the contact list 300, thereby confirming that the entity is revoked and no further communication will be allowed with the entity.

Figure 5:
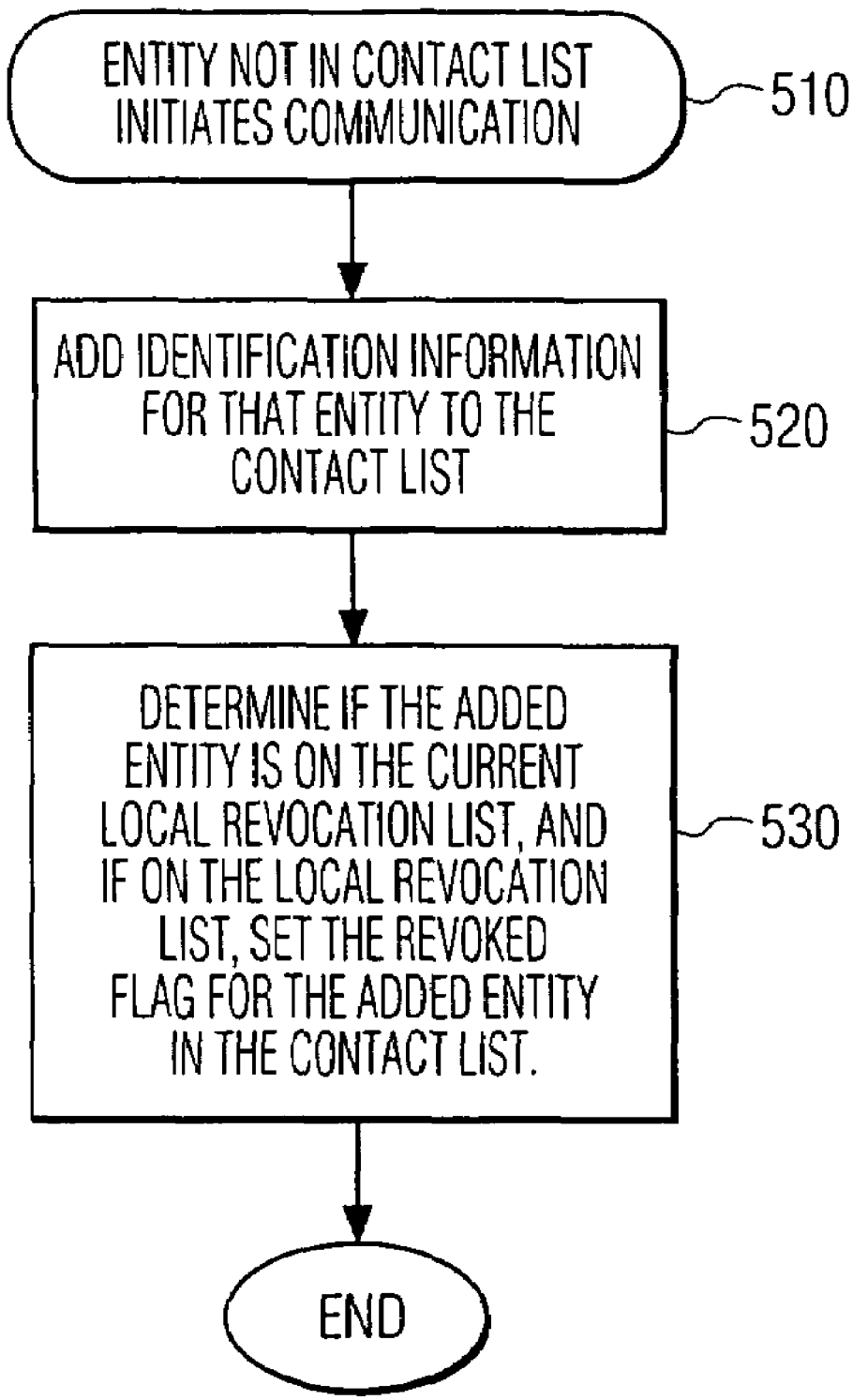

FIG. 5 is a flow diagram illustrating the manner in which the contact list 300 may be updated when an entity not already having its identifier stored in the contact list attempts to communicate with the access control system 100. In step 510, an entity which is not included in the contact list 300 attempts to initiate communication with the access control system 100. If there is sufficient space in the contact list 300 for another entity, step 520 stores the identification information for the new entity, e.g., an entity identifier, in the contact list 300. Step 530 then determines if the new entity is on the current local revocation list 150. If it is, the revoked flag for that entity is set in the contact list, indicating that the entity is revoked and further communication with that entity is terminated.

If an entity not already in the contact list 300 initiates communication with the access control system 100 at a time at which the contact list is already full, i.e., has exceeded its maximum number of entries N, then a particular entry in the contact list may be selected for reuse. In this case, the selected entry in the contact list 300 is written over by setting its identifying information to that of the new entity, and then determining its revocation status as in step 530. The selection of a particular entry in the contact list 300 for reuse may be implemented using random or pseudo-random selection processes such as those described in the above-cited U.S. patent application of Michael Epstein entitled "Updating a Revocation List to Foil an Adversary."

The contact list 300 may be configured such that there is no mechanism for clearing the revocation flag of a particular entry once that flag has been set, as long as that entry remains in the contact list, i.e., is not overwritten as part of the above-described selection process.

The particular technique used for selecting entries for overwriting in the manner described above may be configured to favor selection of entries that have not been revoked. However, there need not be any absolute rule that only non-revoked or previously revoked entries can be selected for overwriting.

In addition, the contact list or a suitable portion thereof could be secured by generating a digital signature which is updated each time the contact list is modified.

It should be noted that a contact list such as that described above could be stored by each entity in a given set of potentially communicating entities. In addition, it is possible that a given entity may store only a portion of a contact list if such an entity does not have sufficient capacity to store an entire list. In this case, the level of security provided will generally be less than that obtained using the full list, but will nonetheless provide significant advantages over conventional revocation list management.

Advantageously, the present invention substantially improves the efficiency of the revocation list management process, and thereby considerably reduces the amount of computation time and other system resources consumed in access control operations.

As previously noted, the present invention can be implemented in a wide variety of different systems and devices, such as, e.g., a set-top box, a computer, a palm-top computing device, as well as portions or combinations of these and other processor-based devices.

The revocation list maintenance operations described in conjunction with FIGS. 4 and 5 can be implemented at least in part in the form of one or more software programs configured for execution using a conventional processor, e.g., a microprocessor, digital signal processor, central processing unit, computer, circuit card, application-specific integrated circuit (ASIC), field programmable gate array (FPGA), or microcontroller, as well as portions or combinations of these and other types of processing devices. Such a processor may be configured in a conventional manner to operate with one or more memory devices, e.g., an electronic memory, an optical or magnetic disk-based memory, a tape-based memory, as well as portions or combinations of these and other types of memory devices.

The above-described embodiments of the invention are intended to be illustrative only. For example, the invention can be used to implement revocation list management in a wide variety of applications, systems and devices other than those described herein. Numerous alternative embodiments within the scope of the following claims will be apparent to those of ordinary skill in the art.

What is claimed is:

1. A method for controlling access to information, the method comprising the steps of:
  maintaining, for a given entity controlling access to the information, a contact list comprising information identifying one or more other entities which have attempted to communicate with the given entity; and
  utilizing the contact list in conjunction with a revocation list associated with the given entity to determine which of at least a subset of the one or more other entities are authorized to communicate with the given entity.

2. The method of claim 1 wherein the given entity and at least a subset of the one or more other entities each comprise a consumer electronics device.

3. The method of claim 1 wherein the maintaining and utilizing steps are implemented in an access control system associated with the given entity.

4. The method of claim 3 wherein the revocation list comprises a local revocation list stored in the access control system.

5. The method of claim 1 wherein the contact list comprises a plurality of entries, each entry including at least an identifier of a particular one of the other entities and a corresponding revocation flag indicating whether authorization of the particular entity has been revoked.

6. The method of claim 5 further including the step of updating the contact list after a modification of the revocation list.

7. The method of claim 6 wherein the step of updating the contact list after a modification of the revocation list further includes the steps of:
  identifying all of the entities in the contact list that do not have their corresponding revocation flag set; and
  determining, for each of the entities identified as being on the contact list but not having a set revocation flag, whether that entity is on a modified local revocation list, and if such an entity is determined to be on the modified local revocation list, setting its revocation flag in the contact list.

8. The method of claim 5 further including the step of updating the contact list if a new entity not already included in the contact list attempts to communicate with the given entity.

9. The method of claim 8 wherein the step of updating the contact list if a new entity not already included in the contact list attempts to communicate with the given entity further includes the steps of:
  storing in the contact list an entity identifier for the new entity if there is sufficient space available in the contact list; and
  determining if the new entity is on the revocation list, and if it is, setting the corresponding revocation flag for the new entity in the contact list.

10. The method of claim 9 further including the step of selecting a particular entry of the contact list for removal from the contact list if there is not sufficient space available in the contact list for the new entity.

11. The method of claim 10 wherein the selecting step is implemented using a random or pseudo-random selection process.

12. The method of claim 5 wherein the contact list is configured such that the revocation flag of a particular entry may not be cleared once that flag has been set as long as that entry remains in the contact list.

13. The method of claim 1 further including the step of periodically generating a digital signature for at least a portion of the contact list.

14. The method of claim 13 further including the step of updating the digital signature each time the contact list is updated.

15. The method of claim 1 wherein each of at least a subset of the other entities stores a contact list having entries corresponding to entities which have attempted to communicate with those other entities.

16. An apparatus for controlling access to information, the apparatus comprising:
  a processor-based device for controlling access to the information, wherein the processor-based device is operative to maintain a contact list comprising information identifying one or more other entities which have attempted to communicate with the processor-based device, and to utilize the contact list in conjunction with a revocation list associated with the given entity to determine which of at least a subset of the one or more other entities are authorized to communicate with the processor-based device.

17. The apparatus of claim 16, wherein the contact list comprises a plurality of entries, each entry including at least an identifier of a particular one of the other entities and a corresponding revocation flag indicating whether authorization of the particular entity has been revoked.

18. An article of manufacture comprising a machine-readable storage medium containing one or more software programs for use in controlling access to information, wherein the programs when executed implement the steps of:
    maintaining, for a given entity controlling access to the information, a contact list comprising information identifying one or more other entities which have attempted to communicate with the given entity; and
    utilizing the contact list in conjunction with a revocation list associated with the given entity to determine which of at least a subset of the one or more other entities are authorized to communicate with the given entity.

19. The article of manufacture of claim 18, wherein the contact list comprises a plurality of entries, each entry including at least an identifier of a particular one of the other entities and a corresponding revocation flag indicating whether authorization of the particular entity has been revoked.

20. The article of manufacture of claim 19, wherein the programs when executed implement the further step of updating the contact list after a modification of the revocation list.

\* \* \* \* \*